(12) United States Patent
Thornberry et al.

(10) Patent No.: US 8,588,575 B2
(45) Date of Patent: Nov. 19, 2013

(54) APPARATUS AND METHODS FOR HIGH-SPEED VIDEO PRESENTATION

(75) Inventors: Kevin Thornberry, Pudsey (GB); Chris Howe, Wakefield (GB)

(73) Assignee: Eldon Technology Limited, Keighley (GB)

( * ) Notice: Subject to any disclaimer, the term of this patent is extended or adjusted under 35 U.S.C. 154(b) by 517 days.

(21) Appl. No.: 12/767,502

(22) Filed: Apr. 26, 2010

(65) Prior Publication Data

US 2011/0262111 A1    Oct. 27, 2011

(51) Int. Cl.
*H04N 5/765* (2006.01)
*H04N 5/931* (2006.01)

(52) U.S. Cl.
USPC .......................................... 386/200; 386/204

(58) Field of Classification Search
None
See application file for complete search history.

(56) References Cited

U.S. PATENT DOCUMENTS

| | | | |
|---|---|---|---|
| 5,727,036 A * | 3/1998 | Maertens | 375/369 |
| RE38,871 E * | 11/2005 | Sekiguchi et al. | 714/752 |
| 7,024,097 B2 * | 4/2006 | Sullivan | 386/241 |
| 7,739,716 B2 * | 6/2010 | Takemura | 725/93 |
| 8,090,458 B2 * | 1/2012 | Kim | 700/94 |

FOREIGN PATENT DOCUMENTS

| | | |
|---|---|---|
| EP | 1274086 A2 | 1/2003 |
| WO | 01/26375 A1 | 4/2001 |

* cited by examiner

*Primary Examiner* — William C Vaughn, Jr.
*Assistant Examiner* — Oluwaseun A Adegeye
(74) *Attorney, Agent, or Firm* — Lowe Graham Jones PLLC

(57) ABSTRACT

A method of presenting video frames of a video segment at a non-standard speed is provided. A frame count is set to an initial value. For each video frame that is to be presented, a time offset relative to a staring time within the video segment is generated. The time offset may be generated by multiplying the frame count by two values. The first value is a length of time for which each selected frame is to be presented to the user, and the second value is the presentation rate of the video segment relative to a normal presentation rate. A video frame within the video segment corresponding to the time offset within the video segment is selected and output for presentation. The frame count is then updated, and the process is repeated for the next frame to be presented.

20 Claims, 9 Drawing Sheets

|  | DWORD (N) | | | | DWORD (N+1) | | | |
|---|---|---|---|---|---|---|---|---|
|  | BYTE 3 (MS BYTE) | BYTE 2 | BYTE 1 | BYTE 0 (LS BYTE) | BYTE 3 (MS BYTE) | BYTE 2 | BYTE 1 | BYTE 0 (LS BYTE) |
| BITS: | 76543210 | 76543210 | 76543210 | 76543210 | 76543210 | 76543210 | 76543210 | 76543210 |
| CASE 0: | 00000000 | 00000000 | 00000001 | 00000000 | xxxxxxx | xxxxxxx | xxxxxxx | xxxxxxx |
| CASE 1: | xxxxxxx | 00000000 | 00000000 | 00000001 | 00000000 | xxxxxxx | xxxxxxx | xxxxxxx |
| CASE 2: | xxxxxxx | xxxxxxx | 00000000 | 00000000 | 00000001 | 00000000 | xxxxxxx | xxxxxxx |
| CASE 3: | xxxxxxx | xxxxxxx | xxxxxxx | 00000000 | 00000000 | 00000001 | 00000000 | xxxxxxx |

4-BYTE PICTURE START CODE: 00000100H

LEAST SIGNIFICANT BYTE, BITS [7..1] = 0

APPARATUS AND METHODS FOR HIGH-SPEED VIDEO PRESENTATION

BACKGROUND

Several different types of electronic devices commonly available today are capable of delivering video content streams or segments for presentation to a user. Such devices may include, for example, digital versatile disk (DVD) players, desktop and laptop computers, and digital video recorders (DVRs), whether configured as a standalone DVR unit or incorporated within a terrestrial, cable, or satellite television receiver, or "set-top box". In addition to presenting a video stream at a normal presentation rate (i.e., at a standard or "real-time" rate), such devices normally allow the use of "trick modes", such as pause, slow-motion, and high-speed fast-forward and reverse, under the control of a user.

To perform a high-speed fast-forward or reverse operation, the device presents some subset of the video frames of the content, one at a time, to progress through the stream at a faster-than-normal pace, such as two, four, eight, or sixteen times the normal presentation rate. To perform the operation, the device typically estimates the data distance between frames being selected and presented to the user during the high-speed presentation, with larger distances being used for higher-speed presentations. Given the variability in the amount of data that may be associated with each frame, such estimation may result in significant variations in playback speed in the absence of any indexing data denoting the locations and relative timing of at least some of the video frames in the stream. In addition, in light of this same variability, the time required to search for the beginning of a complete video frame for presentation to the user during a trick mode may be quite variable as well, thus possibly resulting in a high-speed presentation that appears erratic from the user's perspective.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
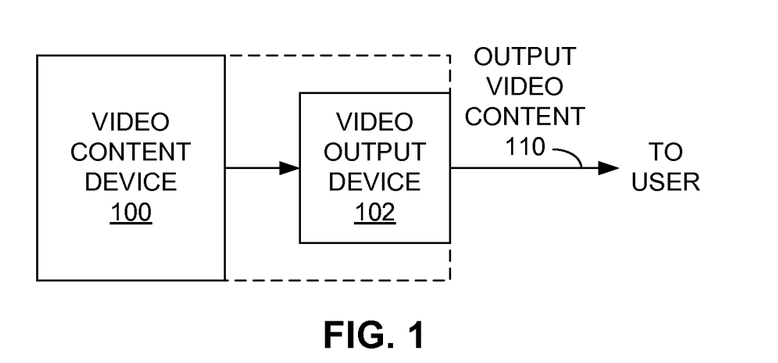
FIG. 1 is a simplified block representation of a video content device according to an embodiment of the invention for presenting video content to a user.

FIG. 1 depicts a video content device 100 capable of presenting output video content 110 to a user, at both a normal (i.e., true-to-life) presentation rate, and at a faster rate, such as, for example, two, four, eight, or sixteen times the normal rate. In one example, the video content device 100 may be a standalone DVR unit, or such a unit incorporated within a satellite, cable, or terrestrial ("over-the-air") television receiver or set-top box. In that case, the video content device 100 delivers the content to a video output device 102, such as a television, video monitor, or the like, which then provides the content in a visual form to the user. Another example of a video content device 100 may be a standalone DVD player. In other arrangements, the video content device 100 may incorporate such an output device 102, such as in the case of a portable DVD player with an integrated video screen. Alternately, the video content device 100 may be a desktop or laptop computer, mobile communication device, personal digital assistant (PDA), gaming system, or any other device configured to present video content, either directly or via a separate output device, to a user, both at normal and accelerated presentation rates, typically under the control of the user.

The video content 110 to be presented includes multiple still images, or "frames", each displayed for some limited period of time, with the successive presentation of the frames creating a moving image from the perspective of the user. Generally, to present the video content at a high-speed rate of multiple times the normal presentation rate, the video content device 100 presents less than all of the frames of the video content 110 so that each frame is visible to the user while progress through the content 110 is accelerated.

Figure 2:
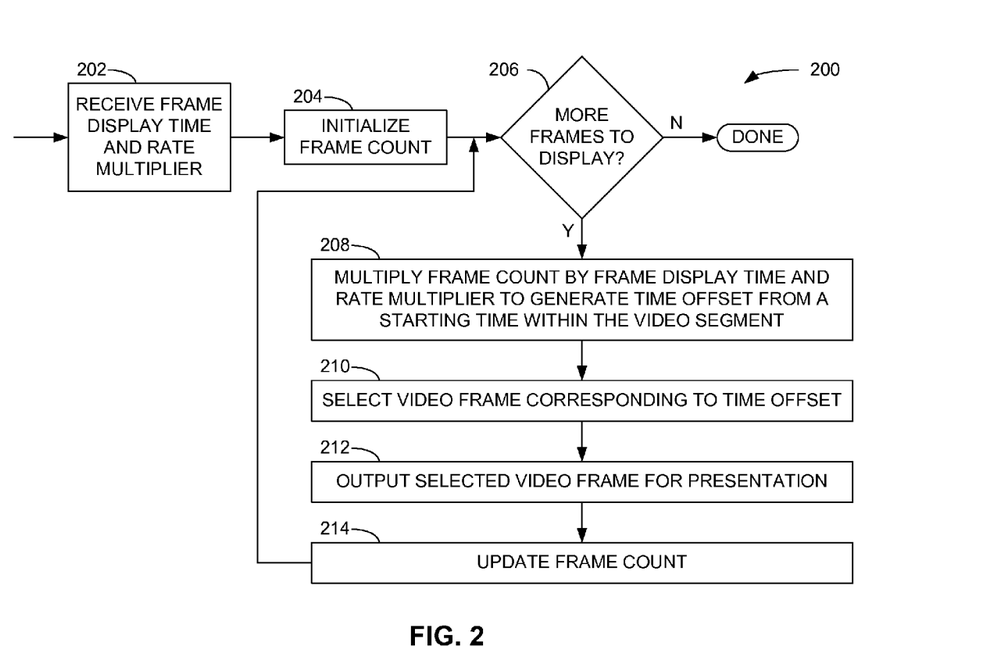
FIG. 2 is a flow diagram of a method according to an embodiment of the invention of presenting video frames of a video segment at a non-standard speed via the video content device of FIG. 1.

FIG. 2 presents a method 200 of presenting video frames of a video segment at a non-standard speed using the video content receiver 100 of FIG. 1. In the method 200, a first value and a second value are received, wherein the first value (i.e., a frame display time) is a length of time for which each selected video frame is to be presented via the video output device 102 of FIG. 1, and wherein the second value (i.e., a rate multiplier) comprises a rate of the presentation of the video segment relative to a normal presentation rate (operation 202). In some examples, the first value may be some value significantly less than a second, such as 20 or 40 milliseconds, while the second value may be some multiple of the normal presentation rate, such as two, four, eight, or sixteen times the normal rate.

Also in the method 200, a frame count is set to some initial value (operation 204), such as one, zero, or minus one. For each video frame to be presented (operation 206), a time offset relative to a starting time within the video segment is generated, wherein the time offset is equal to the frame count multiplied by the frame display time and the rate multiplier (operation 208). A video frame within the video segment corresponding to the time offset within the video segment is selected (operation 210). The selected video frame is then output for presentation (operation 212) and the frame count is updated (operation 214), such as incremented or decremented, in preparation for generating the next time offset for another frame (operation 206).

In other embodiments, a computer-readable storage medium may have encoded thereon instructions for a processor or other control circuitry of the video content device 100, such as a television set-top box with integrated DVR unit, to implement the method 200.

As a result of employing the method 200, video content may be presented to the user in a high-speed mode in either a forward or reverse direction without detailed information, such as indexing data, regarding the video content. Further, the resulting high-speed presentation is likely to be more accurate and consistent with respect to the expected presentation speed than if a method of estimating distances between each frame to be displayed is employed as the presentation progresses. Additional advantages may be recognized from the various implementations of the invention discussed in greater detail below.

Figure 3:
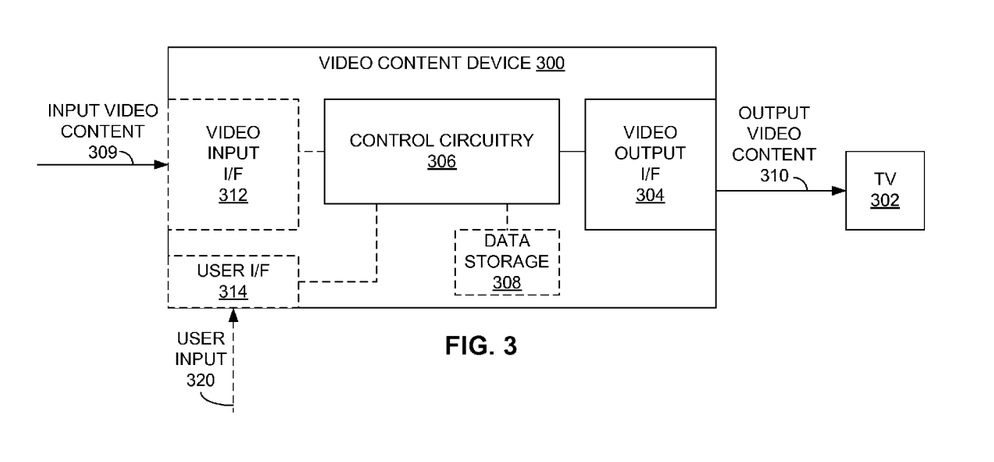
FIG. 3 is a block diagram of a video content device according to an embodiment of the invention.

An example of a video content device 300 according to an embodiment is presented in the block diagram of FIG. 3. In this example, the video content device 300 includes a video output interface 304 and control circuitry 306. Optionally, the receiver 308 may also include, for example, data storage 308 for video content, a video input interface 312, and/or a user interface 314. Other components or subassemblies, such as a power supply, and a flash drive or "smart card" input interface, may be included in the video content device 300, but are not discussed further below. In addition, the functionality of the video content device 310 described hereinafter may be incorporated within a television or other video display device in other implementations.

The video output interface 304 provides output video content 310 to a television 302 or other video content output device. In one example, the video output interface 304 may encode selected video content in accordance with one or more video output formats. For example, the video output interface 304 may format the content for one or more of a composite or component video connection with associated audio connection, a modulated radio frequency (RF) connection, a High-Definition Multimedia Interface (HDMI) connection, or any other format compatible with the television 302.

The video input interface 312, if included, may be any input interface configured to receive video content in any form. In the case of a satellite, cable, or terrestrial ("over-the-air") television set-top box with an integrated DVR unit, the video input interface 312 may receive multiple broadcast channels of input video content 309, with each broadcast channel being associated with a particular major broadcast network, cable news channel, sports network, or other broadcast outlet. The input video content 309 may also include, for example, video-on-demand (VOD) and/or pay-per-view (PPV) video content.

In the case of a satellite set-top box, the video input interface 312 may receive a signal carrying the input video content 309 via a parabolic antenna and a low-noise block-converter (LNB) (not illustrated in FIG. 3), which receives, down-converts, and forwards the signal to the video input interface 402, typically via a coaxial cable. The video input interface 312 may include one or more tuners allowing the user to select particular programming channels of the incoming content 309 for forwarding to the television 302, as well as to an audio receiver or other entertainment system components. The video input interface 312 may also perform any decryption, decoding, and similar processing of the input content 309 required to place the content 309 in a format usable by the video output interface 304. In one example, such a format may be one of the Motion Picture Experts Group (MPEG) formats, such as MPEG-2 or MPEG-4, although other television content format standards may be utilized in other embodiments.

In another example, if the video content device 300 were configured as a cable television set-top box for a cable television system, the video input interface 312 may be configured to receive the video content 309 from a cable head-end. In yet another communication environment, if the video content device 300 is a terrestrial television receiver, the video input interface 312 may receive the input video content 309 via a terrestrial antenna receiving television signals "over the air".

In other implementations, the input video content 309 may be received by way of an optical disk (such as a DVD), a flash drive, or other storage means. Accordingly, the video input interface 312 may be configured as a DVD drive unit, a Universal Serial Bus (USB) interface, or any other interface configured to read the input video content 309 from a data storage medium.

In yet other arrangements, the video input interface 312 may be configured to receive the input video content 309 by way of a wired or wireless communication interface, such as, for example, an Ethernet interface, an IEEE 802.11x (Wi-Fi) interface, or the like providing connectivity with a Digital Subscriber Line (DSL) or cable modem for data transfers with the Internet or similar wide-area network (WAN). Similarly, the video input interface 312 may facilitate connection with a cellular communication network, such as a 3G (third generation) or 4G (fourth generation) telephone network, in other implementations.

In some embodiments, the input video content 309 received at the video content device 300 may be stored in the data storage 308 incorporated within the video content device 300. Thus, the data storage 308 may store the input video content 309 for later presentation to the user via the video output interface 304. Generally, the data storage 308 operates as an internal digital video recorder (DVR) unit allowing a user to record selected programs as video files for subsequent viewing at a more convenient time. As described more fully below, the data storage 308 may also facilitate various playback viewing control commands, or "trick modes", such as fast-forward, reverse, slow-motion, and pause, of output video content 310 that is stored in its entirety in the data storage 308, or that is simultaneously or concurrently being received via the input video interface 312. In other cases, the video input interface 312 may enable trick mode usage in cases in which at least portions of the input video content 309 are stored on a separate storage medium, such as a DVD or flash memory drive.

The data storage 308 may include any type of volatile or nonvolatile memory capable of storing video content, including, but not limited to, static random access memory (SRAM), dynamic random access memory (DRAM), flash memory, and magnetic and/or optical disk drives.

To allow a user of the video content device 300 to control trick mode presentation of the output video content 310, as well as perform other operations typically associated with a media content device 300, the user interface 314 may facilitate the entry of commands by way of user input 320. In many examples, the user interface 314 may be a remote control interface configured to receive such input 320 by way of infrared (IR), radio frequency (RF), acoustic, or other wireless signals produced by a remote control device. To facilitate such command entry, the video content device 300 may provide a menu system presented to the user via the television 302. Such a menu system may include an electronic program guide (EPG) in some embodiments to allow the users to view a schedule and description of upcoming television programs. In some implementations, the user interface 314 may also include any of a keyboard, mouse, and/or other user input device.

The control circuitry 306 is configured to control and/or access other components of the video content device 300, including, but not limited to, the video input interface 312, the data storage 308, the video output interface 304, and the user interface 314. The functionality of the control circuitry 306 as it more specifically relates to the presentation of the output video content 310 at accelerated rates is described more completely below. The control circuitry 306 may include one or more processors, such as a microprocessor, microcontroller, or digital signal processor (DSP), configured to execute instructions directing the processor to perform the functions associated with the control circuitry 306. In another implementation, the control circuitry 306 may be completely hardware-based logic, or may include a combination of hardware, firmware, and/or software elements.

Figure 4:
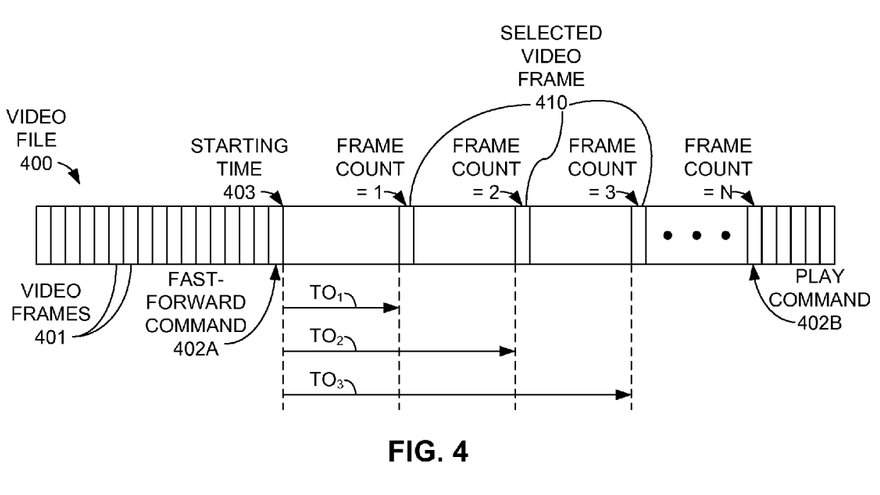
FIG. 4 is a graphical representation of a video file being presented at a higher-than-normal speed according to an embodiment of the invention.

FIG. 4 provides a graphical representation of a video file 400 being presented as the output video content 310 via the television 302 of FIG. 3 to a user. The video file 400 includes a sequence of video frames 401, each of which is displayed during a normal or standard presentation rate. In one example, at least a portion of the video file 400 is stored in the data storage 308 to allow the control circuitry 306 to present the video file 400 at both normal (i.e., 1×) and above-normal (e.g., 2×, 4×, 8×, or 16×) presentation rates. In one implementation, the video file 400 may represent a complete video program, such as a movie, television episode, news program, or a sporting event. In other examples, the video file 400 may be a portion of a program, multiple programs, or some other length of video segment.

As shown in FIG. 4, the first of the sequence of video frames 401 is located at the left end of the video file 400, with normal presentation progressing from left to right. In this specific example, a first portion of the video file 400 is presented at a normal rate, up to a starting time 403 at which the control circuitry 306 receives a fast-forward command 402A. In one example, the fast-forward command 402A is initiated by a user via user input 320 received through the user interface 314. Additionally, the command 402A may indicate the desired presentation rate (2×, 4×, 8×, etc.) relative to the normal presentation rate. In other examples, the fast-forward command 402A is received by way of another interface, or is generated internal to the video content device 300, such as by way of a timer.

In response to receiving the fast-forward command 402A, the control circuitry 306 begins the process of selecting, accessing, and outputting a subset of the frames 401 of the video file 400 for the higher-speed presentation beginning at the starting time 403. In one implementation, the control circuitry 306 initializes a "frame count" variable to one, and then generates a time offset from the starting time 403 in the video file 400 for each frame 410 to be selected and presented in response to the fast-forward command 402A. The time offset depends on the current frame count, the length of time each selected frame 401 is to be presented via the television 302 (i.e., the frame display time), and the rate of the desired fast-forward presentation relative to the normal presentation (i.e., the rate multiplier):

$$\text{time\_offset} = \text{frame\_count} \times \text{frame\_display\_time} \times \text{rate multiplier}$$

For example, for a frame count of one, a frame display time of 40 milliseconds (msec) (equivalent to a frame display rate of 25 Hertz (Hz)), and a rate multiplier of 16, the time offset for a frame count of one ($TO_1$) is (1)(40 msec)(16)=640 msec=0.64 seconds (sec). This value is then employed as an offset relative to the starting time 403 within the video file 400. This same calculation may be made for multiple frame counts of one, two, three, . . . , and N, resulting in selected video frames 410 for each of time offsets $TO_1, TO_2, \ldots,$ and $TO_N$. Each of the selected frames 410 is extracted and output in order via the video output interface 304 for presentation via the television 302 for the frame display time as long as the fast-forward command 402A is in effect. In one example, the user issues a play command 402B as user input 320 via the user interface 314 to return to the normal presentation rate, during which each of the remaining video frames 401 are displayed via the video output interface 304. In other examples, other user commands concerning playback of the video file 400, such as pause, reverse, and the like, may also terminate the fast-forward command 402A.

While FIG. 4 exemplifies a particular fast-forward scan sixteen times the normal presentation rate, other faster and slower presentation rates may be employed by utilizing the same formula presented above. Further, faster-than-normal presentation rates in the reverse direction (e.g., using rate multipliers of −2, −4, −8, and so on) may be realized as well.

To utilize the time offsets, the data size of a video file being presented may be related in some manner to the length of time associated with a normal presentation rate for the video file. More specifically, with the starting time 403 and the generated time offsets for each video frame to be presented, these time values may be compared with timing information and related data size information for the video file 400 to identify a position within the video file 400 associated with the each of the desired frames 410.

Figure 5:
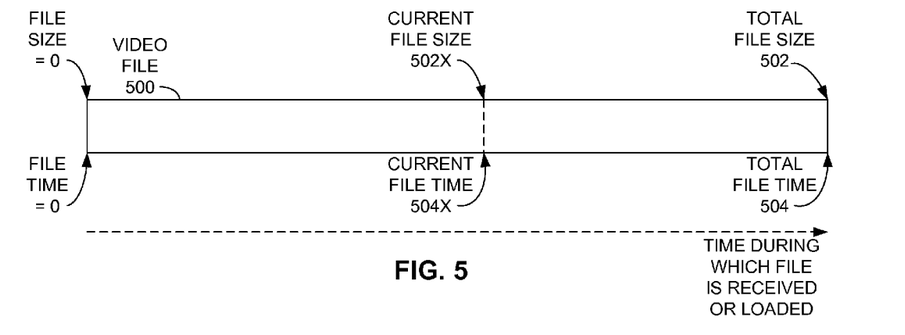
FIG. 5 is a graphical representation of a video file in which a total time and size for the file are recorded according to an embodiment of the invention.

FIG. 5 presents one example of a video file 500 stored in the data storage 308, for which the total file size 502 and the total file time 504 (i.e., the total playing time of the video file 500 at the normal presentation rate) are known. The control circuitry 306 may ascertain this information as a result of, for example, receiving the video file 500 via the video input interface 312, storing the video file 500 in the data storage, and/or metadata included within, or accompanying, the video file 500. Further, if the video file 500 is being transferred to the data storage 308 while concurrently being presented via the video output interface 304, the control circuitry 306 may track the current file size 502X and the current file time 504X as the video file 500 is being stored to relate the data size and time length associated with the video file 500. In one example, a ratio of the combined starting time 403 and offset time to the total file time 504 (or current file time 504X), multiplied by the total file size 502 (or current file size 502X)

yields a data location within the video file 500 corresponding to the selected video frame 410 associated with the offset time:

$$data\_location = (starting\_time + offset\_time)\left(\frac{file\_size}{file\_time}\right)$$

Figure 6:
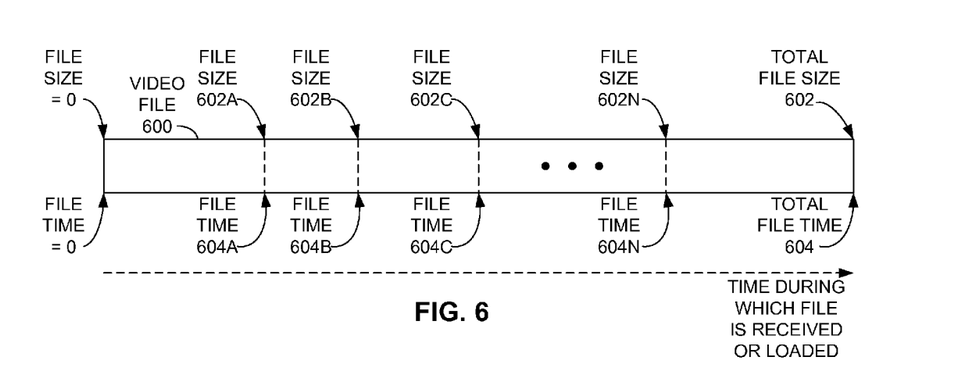
FIG. 6 is a graphical representation of a video file in which a current time and size for the file are recorded periodically while the file is being received according to an embodiment of the invention.

FIG. 6 provides an example in which data relating multiple data locations in a video file 600 to specific time values or timestamps of the file 600. As shown in FIG. 6, in addition to a total file size 602 and a corresponding total file time 604, each of multiple file size values 602A through 602N is associated with a specific one of multiple file time values 604A through 604N. In one implementation, as the video input interface 312 receives, stores, and or plays the video file 600 or corresponding video data at a normal presentation rate, the control circuitry 306 periodically tracks the amount of data of the video file 600 that has been received, stored, and/or presented, as well as the current time elapsed from the start of video file 600 reception. In one example, the current file size 602 is noted or recorded every 0.1 seconds, although other time periods may be utilized in other embodiments. As illustrated in FIG. 6, noting the file size 602 periodically may result in a non-linear progression in file size 602 due to differences in the instantaneous rate at which the data of the video file 600 is transferred, as is typical in MPEG-2 and MPEG-4 encoded video.

The control circuitry 306 may then utilize the data shown in FIG. 6 in a number of ways to relate the time offset described above with a particular location within the video file 600. For example, for the sum of the starting time 403 and time offset being less than a first file time 604A and a second file time 604B, the control circuitry 306 may take either the first file size 602A or the second file size 602B as denoting the location in the video file 600 associated with the time offset. In another implementation, the data midpoint between the first file size 602A and the second file size 602B may serve as the data location. Under another scenario, the control circuitry 306 may presume a linear relationship between the first two file sizes 602A, 602B and their associated file times 604A, 604B to generate the data location from the time offset, wherein Δfile_size is the different between the first two file sizes 602A, 602B, and Δfile_time is the different between the first two file times 604A, 604B:

$$data\_location = \\ first\_file\_size + (starting\_time + offset\_time - first\_file\_time)\left(\frac{\Delta file\_size}{\Delta file\_time}\right)$$

Such calculations may be made regarding any two consecutive file sizes 602 and corresponding file times 604 for time offsets residing therebetween.

Once a data location for a time offset has been determined, the control circuitry 306 may search in the vicinity or neighborhood of the data location within the video file 400 to find the start of the selected video frame 410. Often, the start of a video frame 410 may be indicated by way of a unique set of data bytes, such as a picture start code. Thus, when searching through the video file 400 in the neighborhood of a selected video frame 410, the control circuitry 306 may recognize the beginning of a frame by encountering the picture start code.

In the embodiment of an MPEG video file 400 or stream, a four-byte (32-bit) picture start code may designate the beginning of each video frame 401. This picture start code, in hexadecimal notation, is 00000100H in one example. Presuming the video file 400 is stored in data storage 308 in which each byte of the file 400 is individually addressed and read, the control circuitry 306 may search for the picture start code by checking if the most significant seven bits of each byte is zero. Those bytes fitting that description are thus candidates for holding one of the four picture start code bytes, thus leading the control circuitry 306 to read surrounding bytes of the data storage 308 to determine if the picture start code is represented. Similarly, if the data storage 308 is word-addressable, in which two bytes may be read in a single operation, the most significant seven bits of each byte of the word may be checked for zeroes, thus possibly indicating that the picture start code may partially reside within that word.

Figure 7:
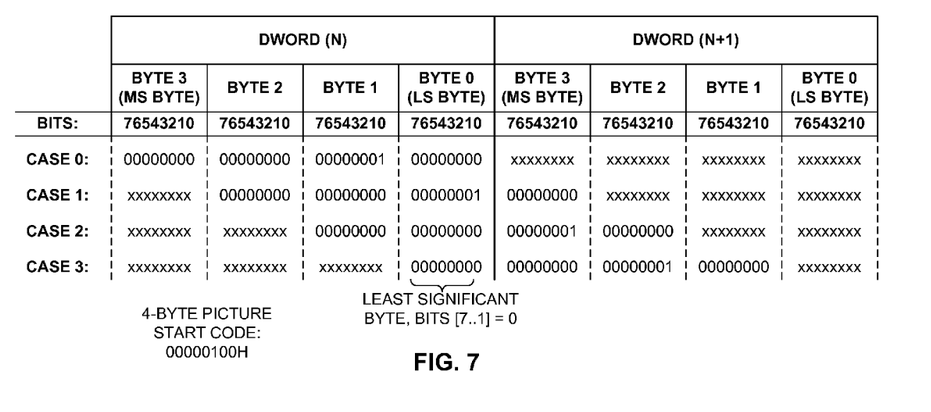
FIG. 7 is a data diagram exhibiting the four possible cases of the alignment of a Motion Picture Experts Group (MPEG) picture start code with respect to four-byte double-word according to an embodiment of the invention.

Further, the data storage 308 may be organized as multiple double-word (four-byte) memory locations, thus allowing access to four bytes of the video file 400 at a time. Under those circumstances, the amount of processing time required to search for a picture start code of 00000100H may be greatly reduced. FIG. 7 provides a representation of the four possible alignments of the start picture code relative to a double-word, or DWORD. More specifically, the picture start code may begin in the first (most-significant) byte (Case 1), the second byte (Case 2), the third byte (Case 3), or the fourth (least-significant) byte (Case 4) of a double-word. In each of the four different possibilities shown in FIG. 7, the seven most-significant bits of the least significant byte of the double-word are all zero. As a result, a search of a video file 400 for a picture start code may begin by perusing the least-significant of each double-word in such a manner, and then searching more specifically for the entire picture start code if the seven most-significant bits of the least-significant byte are indeed zero. Presuming a fairly randomized data pattern, a successful matching of the least-significant byte as described above may happen approximately only once every 128 double-words, thus significantly accelerating the search for a picture start code.

Figure 8:
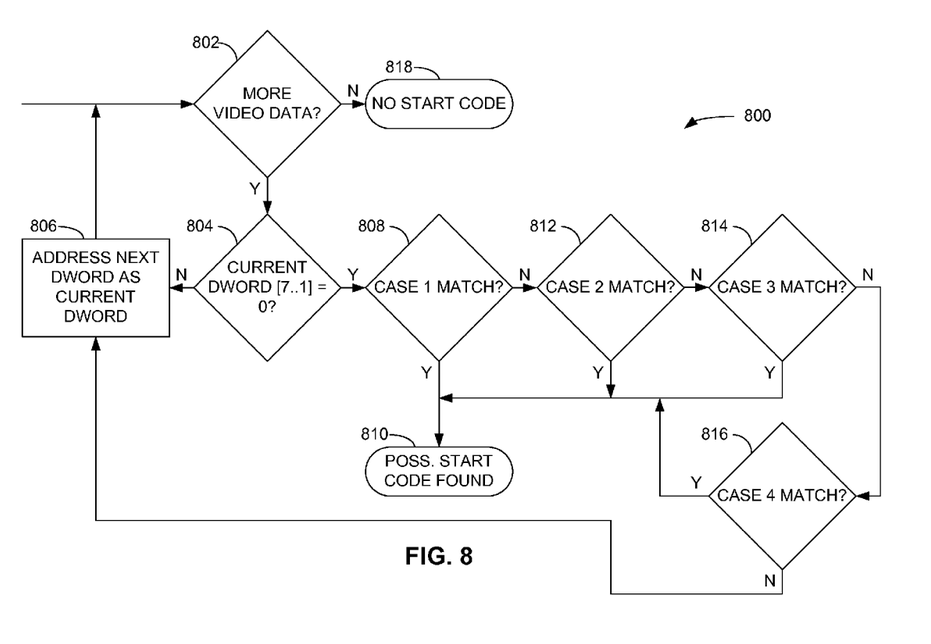
FIG. 8 is a flow diagram of a method according to an embodiment of the invention for searching for an MPEG picture start code in a video file, stream, or segment.

FIG. 8 presents a flow diagram of a method 800 for searching for the 00000100H picture start code in an MPEG video stream or segment in double-word-organized memory, as described above. In the method, while video data remains to be searched (operation 802), the control circuitry 306 determines if the seven most-significant bits of the least-significant byte of the current double-word are zero (operation 804). If not, the search continues with the next double-word (operation 806); otherwise, the control circuitry 306 compares the current double-word with the picture start code (operation 808) (Case 1 of FIG. 7). If a match occurs, a candidate picture start code, and thus possibly a video frame, has been found starting at the current double-word (operation 810). If not, the three least-significant bytes of the current double-word in conjunction with the most-significant byte of the next double-word are compared with the picture start code (operation 812) (Case 2 of FIG. 7). If a match occurs, a candidate picture start code has been found (operation 810). Otherwise, the control circuitry 306 compares the two least-significant bytes of the current double-word and the two most-significant bytes of the following double-word with the picture start code (operation 814). If a match results, a possible picture start code has been found (operation 810). Else, the least-significant byte of the current double-word in conjunction with the three most-significant bytes of the next double-word is compared with the start code (operation 816). If a match is found, the start of a video frame may have been discovered (operation 810). Otherwise, the method 800 proceeds to the next double-word as the current double-word for start code comparison (operation

806). If no video data remains, the method 800 ends without a potential picture start code being found (operation 818).

If the video file 400, segment, or stream constitutes a raw MPEG packetized elementary stream (PES), the potential picture start code found via the method 800 may be assured to be an actual start code. However, if the MPEG PES is encapsulated within a higher-level data stream, such as an MPEG transport stream (TS), the control circuitry 306 may be configured to determine if the picture start code discovered by way of the method 800 is an actual start code for an MPEG PES, or actually resides within an MPEG TS header.

Figure 9:
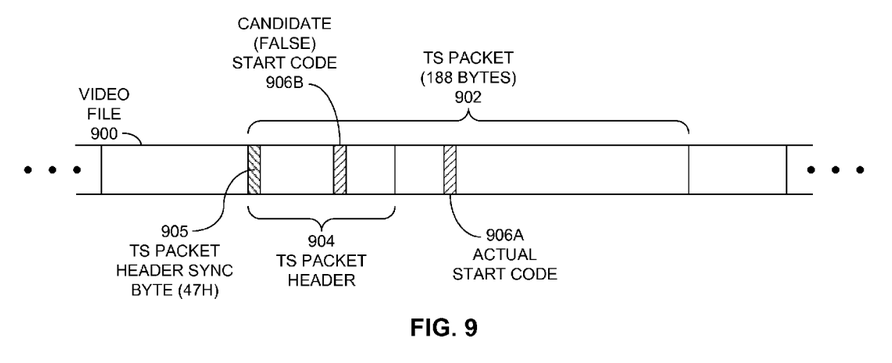
FIG. 9 is a graphical representation of a false candidate start code and an actual start code in a video file providing an MPEG transport stream according to an embodiment of the invention.

FIG. 9 depicts a video file 900 that includes an MPEG transport stream having a plurality of TS packets 902. In most cases, each TS packet is 188 bytes in length, with a TS packet header 904 located at the leading end of the packet 902. In this case, the control circuitry 306 has discovered a candidate start code 906B within the TS packet header 904 via the method 800. To determine whether the candidate start code 906B is an actual start code, the control circuitry 306 may search backward through the video file 900 for at least the length of a TS packet (in this case, 188 bytes) for the start of a TS packet header 904. In one example, the start of a header 904 may be identified a TS packet header sync byte 905 (which, in at least one case, is a byte with a value of 47H), although other data distinguishing the TS header from the TS payload data (including PES data) may be used to similar effect. If the control circuitry 306 identifies the TS header, and determines that the candidate start code 906B lies within the TS header, the control circuitry 306 may then ignore the candidate start code 906B and continue its search via the method 800 discussed above for an actual start code 906A.

Once an actual picture start code 906A is discovered, the control circuitry 306 may peruse the header or other information or metadata within the frame 401 associated with the picture start code to determine whether that particular frame 401 is capable of being presented to the user via the video output interface 304 and the connected television 302. For example, the control circuitry 306 may require that the video frame 401 associated with the discovered start code be an intra-coded, or fully-specified, picture, such as an MPEG I-frame, in order to be output and presented to the user. Such intra-coded frames do not rely on data from adjacent or nearby video frames to be fully represented to the user. Accordingly, the control circuitry 306 may ignore "predicted" frames (such as MPEG P-frames) or "bi-predictive" frames (e.g., MPEG B-frames) that rely on other video frames for their complete representation, as such frames necessitate the reading of multiple frames to form a complete image for presentation. In that case, the control circuitry 306 may ignore such frames and begin searching anew for another picture start code to yield a fully-specified frame for presentation in a high-speed presentation mode.

At least some embodiments as described herein thus facilitate efficient and accurate presentation of video frames in a higher-than-normal speed mode. By performing a simple calculation, a video content device may quickly determine areas of a video file, segment, or stream from which to select and extract video frames for visual presentation to a user. Additionally, once such an area is determined, searching for the start of a selected video frame within the file, segment, or stream may be accomplished quickly using the techniques discussed above. As a result, the resulting high-speed presentation of a video file, either in a forward or reverse playback direction, is likely to be more accurate and consistent in presentation than estimating distances from one presented frame to another within the file. Therefore, the resulting high-speed presentation should allow the user to more accurately control high-speed trick modes when navigating within a video stream or file.

While several embodiments of the invention have been discussed herein, other implementations encompassed by the scope of the invention are possible. For example, while various embodiments have been described largely within the context of DVRs incorporated within satellite, cable, and terrestrial television receivers or set-top boxes, other electronic devices, such as standalone DVRs, televisions, mobile communication devices, PDAs, general-purpose computer systems, gaming systems, and other video content devices capable of providing high-speed forward or reverse presentation modes, may incorporate various aspects of the functionality described above to similar effect. In addition, aspects of one embodiment disclosed herein may be combined with those of alternative embodiments to create further implementations of the present invention. Therefore, while the present invention has been described in the context of specific embodiments, such descriptions are provided for illustration and not limitation. Accordingly, the proper scope of the present invention is delimited only by the following claims and their equivalents.

What is claimed is:

1. A method of presenting video frames of a video segment at a non-standard speed on a video output device, the method comprising:

receiving a first value and a second value, wherein the first value comprises a length of time for which each selected video frame is to be presented via a video output device, and wherein the second value comprises a rate of the presentation of the video segment relative to a normal presentation rate;

setting a frame count for a first video frame to be presented at the non-standard speed to an initial value of one; and for each of a plurality of video frames to be presented at the non-standard speed on the video output device:

generating a time offset relative to a starting time within the video segment, wherein the time offset comprises a value equal to the frame count multiplied by the first value and the second value;

selecting a next video frame within the video segment corresponding to the time offset within the video segment, wherein the selected next video frame follows a plurality of unselected video frames;

outputting the selected next video frame for presentation on the video output device; and incrementing the frame count, wherein the process of generating the time offset, selecting the next video frame, outputting the selected next video frame, and incrementing the frame count continues until one of an end of the video segment and a return to a standard speed of presentation.

2. The method of claim 1, wherein:

the video segment comprises a video file; and the starting time comprises a time value relative to the start of the video file.

3. The method of claim 1, further comprising:

receiving a data size of the video segment and a time length of the video segment;

wherein selecting the next video frame corresponding to the time offset comprises determining a data position within the video segment corresponding to the time offset based on the data size and the time length.

4. The method of claim 1, further comprising:

receiving a data set relating each of a plurality of time values with each of a plurality of data offsets of the video segment, wherein each of the data offsets indicates an offset from the start of the video segment corresponding with its associated time value from the start of the video segment;

wherein selecting the next video frame corresponding to the time offset comprises determining a data position within the video segment corresponding with the time offset based on the data set.

5. The method of claim 1, wherein:

each of the video frames comprises a Motion Picture Experts Group (MPEG) frame; and selecting the next video frame corresponding to the time offset comprises finding a picture start code for the video frame.

6. The method of claim 5, wherein:

the picture start code comprises the four-byte data sequence of 00 00 01 00, in hexadecimal;

the video segment is stored as a sequence of four-byte double-words, wherein each double-word is ordered from most-significant byte to least-significant byte; and finding the picture start code for the next video frame comprises, beginning at one of the double-words of the video segment:

if the seven most-significant bits of the least-significant byte of the current double-word are not zero, continuing to the next double-word of the video segment to find the picture start code;

if the seven most-significant bits of the least-significant byte of the current double-word are zero, determining if the picture start code begins within the current double-word;

if the picture start code begins within the current double-word, designating the current double-word as the start of the video frame; and if the picture start code does not begin within the current double-word, continuing to the next double-word of the video segment to find the picture start code.

7. The method of claim 5, further comprising:

in response to finding the picture start code for the next video frame, determining if the next video frame for the found picture start code is capable of presentation; and if the next video frame for the found picture start code is not capable of presentation, finding another picture start code in the video segment; and if the video frame for the found picture start code is capable of presentation, identifying the video frame for the found picture start code as the next video frame corresponding to the time offset.

8. The method of claim 7, wherein:

the next video frame for the found picture start code is capable of presentation if the video frame for the found picture start code comprises an MPEG video I-frame.

9. The method of claim 5, further comprising:

if the video segment comprises an MPEG transport stream, determining whether the found picture start code is within a transport stream packet header; and if the found picture start code is within the transport stream packet header, finding another picture start code in the video segment.

10. A method of finding, within a video segment to be presented at a non-standard speed for display, a Packetized Elementary Stream (PES) header in a Motion Picture Experts Group (MPEG) video stream organized as a series of four-byte double-words, the method performed by a video output device, the method comprising:

at a current double-word of the video stream, if the seven most significant bits of the least-significant byte are not zero, proceeding to the next double-word of the video stream to find a header;

if the seven most-significant bits of the least-significant byte are zero, determining if a header start code begins within the current double-word, wherein the start code comprises a four-byte sequence of 00 00 01 00, in hexadecimal;

if the start code begins within the current double-word, designating the current double-word as the start of a header; and if the start code does not begin with the current double-word, proceeding to the next double-word of the video stream to find a header.

11. The method of claim 10, wherein determining if the start code begins within the current double-word comprises:

if the current double-word comprises the start code, designating the most-significant byte of the current double-word as the beginning of the start code;

else if the three least-significant bytes of the current double-word comprise the first three bytes of the start code, and if the most-significant byte of the next double-word comprises the last byte of the start code, designating the second most-significant byte of the current double-word as the beginning of the start code;

else if the two least-significant bytes of the current double-word comprise the first two bytes of the start code, and if the two most-significant bytes of the next double-word comprise the last two bytes of the start code, designating the second least-significant byte of the current double-word as the beginning of the start code;

else if the least-significant byte of the current double-word comprises the first byte of the start code, and if the three most-significant bytes of the next double-word comprise the last three bytes of the start code, designating the least-significant byte of the current double-word as the beginning of the start code;

else continuing the determining operation at the next double-word.

12. The method of claim 10, further comprising:

if the video stream comprises an MPEG transport stream, determining whether the designated start code is located within a transport stream packet header; and if the designated start code is located within the transport stream packet header, proceeding to finding a start code beginning after the location of the designated start code.

13. The method of claim 12, wherein determining whether the designated start code is located within a transport stream packet header comprises:

finding the start of a most recent transport stream packet header prior to the location of the designated start code; and determining whether designated start code is located within the most recent transport stream packet header.

14. A video content device, comprising:

a video output interface configured to stream video frames of a video segment for presentation to a user; and control circuitry configured to:

while streaming the video frames of the video segment via the video output interface, receive a command to present the video segment at an alternative speed by presenting selected video frames of the video segment via the video output interface; and where in response to receiving the command, the control circuitry is further configured to:

for a first video frame to be presented at the alternative speed, initialize a frame count to one; and for each of a plurality of next video frames to be presented via the video output interface during presentation at the alternative speed:

generate a time offset relative to a starting time within the video segment, wherein the time offset comprises a value equal to the frame count multiplied by a first value and a second value, wherein the first value comprises a length of time for which each selected video frame is to be presented via the video output interface, and wherein the second value comprises a ratio of the alternative speed relative to a normal presentation rate;

select a next video frame of the video segment corresponding to the time offset within the video segment, wherein the selected next video frame follows a plurality of unselected video frames;

output the selected next video frame via the video output interface for presentation; and increment the frame count, wherein the process of generating the time offset, selecting the next video frame, outputting the selected next video frame, and incrementing the frame count continues until one of an end of the video segment and a return to a standard speed of presentation.

15. The video content device of claim 14, wherein:
the alternative speed comprises one of a forward presentation rate faster than the normal presentation rate, and a reverse presentation rate faster than the normal presentation rate.

16. The video content device of claim 14, wherein:
the starting time comprises the current time within the video segment when the command is received.

17. The video content device of claim 14, further comprising:
a user interface configured to receive user input;
wherein the user input comprises the command.

18. The video content device of claim 14, further comprising:
data storage configured to store a video file comprising the video segment;
wherein the control circuitry is configured to select the next video frame of the video segment corresponding to the time offset by determining a data position within the video file corresponding with the time offset based on a total size of the video file and a total time length associated with the video file.

19. The video content device of claim 14, further comprising:
data storage configured to store a video file comprising the video segment;
wherein the control circuitry is configured to select the next video frame of the video segment corresponding to the time offset by determining a data position within the video file corresponding with the time offset based on a data set relating each of a plurality of time values with each of a plurality of data offsets, wherein each of the data offsets indicates an offset from the start of the video file corresponding with its associated time value from the start of the video file.

20. The video content device of claim 14, wherein:
the next video frame starts with a picture start code that comprises a four-byte data sequence of 00 00 01 00, in hexadecimal;
the video segment is stored as a sequence of four-byte double-words, wherein each double-word is ordered from most-significant byte to least-significant byte; and
the control circuitry is configured to find the picture start code for the next video frame, beginning at one of the double-words of the video segment:
if the seven most-significant bits of the least-significant byte of a current double-word are not zero, continuing to a next double-word of the video segment to find the picture start code;
if the seven most-significant bits of the least-significant byte of the current double-word are zero, determining if the picture start code begins within the current double-word;
if the picture start code begins within the current double-word, designating the current double-word as the start of the video frame; and
if the picture start code does not begin within the current double-word, continuing to the next double-word of the video segment to find the picture start code.

* * * * *